United States Patent [19]
Sherman

[11] Patent Number: 6,103,130
[45] Date of Patent: Aug. 15, 2000

[54] TREATMENT OF CONTAMINATED LIQUIDS WITH OXIDIZING GASES

[75] Inventor: Jeffrey H. Sherman, Dallas, Tex.

[73] Assignee: GRT, Inc., Dallas, Tex.

[21] Appl. No.: 09/325,503

[22] Filed: Jun. 3, 1999

[51] Int. Cl.⁷ ........................................ C02F 1/72
[52] U.S. Cl. .................. 210/754; 210/758; 210/760; 210/908; 210/192
[58] Field of Search ................... 210/754, 758, 210/760, 908, 192

[56] References Cited

U.S. PATENT DOCUMENTS

| | | | |
|---|---|---|---|
| 5,151,187 | 9/1992 | Behmann | 210/607 |
| 5,152,888 | 10/1992 | Koyama | 210/195.3 |
| 5,156,173 | 10/1992 | Keyser et al. | 134/61 |
| 5,271,810 | 12/1993 | Keyser et al. | 202/185.2 |
| 5,316,682 | 5/1994 | Keyser et al. | 210/649 |
| 5,510,544 | 4/1996 | Keyser | 570/125 |
| 5,658,458 | 8/1997 | Keyser et al. | 210/195.1 |
| 5,855,775 | 1/1999 | Kerfoot | 210/170 |
| 5,868,945 | 2/1999 | Morrow et al. | 210/760 |

*Primary Examiner*—David A. Simmons
*Assistant Examiner*—Betsey J. Morrison
*Attorney, Agent, or Firm*—Michael A. O'Neil

[57] ABSTRACT

In a method of removing organic contaminants from a liquid, an oxidizing gas is formed into sub-micron size bubbles which are dispersed into a flowing initially contaminated liquid, after which the treated liquid is recovered. The oxidizing gas is preferably selected from a group including ozone and chlorine dioxide and is utilized immediately upon its manufacture.

12 Claims, 5 Drawing Sheets

TREATMENT OF CONTAMINATED LIQUIDS WITH OXIDIZING GASES

TECHNICAL FIELD

This invention relates generally to the treatment of contaminated liquid with oxidizing gases, and more particularly to the treatment of liquids of the type having organic contaminants contained therein with oxidizing gases such as ozone and chlorine dioxide.

BACKGROUND AND SUMMARY OF THE INVENTION

As is well known, various liquids are contaminated by organic materials. For example, used lubricating oil frequently includes organic materials comprising products of combustion. Waste water is almost always contaminated by organic materials such as human and animal waste, decaying vegetable materials, etc.

As is also well known, organic contaminants can be removed from liquids by exposing the contaminated liquids to oxidizing agents, particularly oxidizing gases. Ozone and chlorine dioxide are among the most potent of the oxidizing gases, and therefore offer tremendous potential with respect to the removal of organic contaminants from used lubricating oil, waste water, and other liquids. Unfortunately, the inherent instability of ozone and chlorine dioxide has heretofore prevented the commercial utilization thereof in the removal of organic contaminants from liquids.

The present invention comprises a method of and apparatus for utilizing oxidizing gases to remove organic contaminants from liquids which overcomes the foregoing and other problems long since associated with the prior art. In accordance with the broader aspects of the invention, the oxidizing gas is utilized at its source and is formed into sub-micron size bubbles which are dispersed into a flowing liquid to be decontaminated. Due to the sub-micron size of the bubbles, the surface area of the oxidizing gas is greatly increased, thereby greatly increasing the efficiency of the gas in oxidizing organic contaminants from the liquid.

In accordance with a first application of the invention, an oxidizing gas is selected from the group including ozone and chlorine dioxide. The oxidizing gas is formed into sub-micron size bubbles by directing it through a sintered stainless steel or glass tube. Used lubricating oil is caused to flow past the exterior of the stainless steel or glass tube. The flowing liquid cleaves sub-micron size bubbles of the oxidizing gas from the surface of the stainless steel tube. The sub-micron size bubbles of oxidizing gas are dispersed into the used lubricating oil, whereupon organic contaminants contained within the used lubricating oil are efficiently oxidized.

In accordance with a second application of the invention, an oxidizing gas is selected from the group including ozone and chlorine dioxide. The oxidizing gas is formed into sub-micron sized bubbles by directing it through a sintered stainless steel or glass tube. Waste water is caused to flow past the exterior of the stainless steel tube. The flowing liquid cleaves sub-micron size bubbles of the oxidizing gas from the surface of the stainless steel tube. The sub-micron size bubbles of oxidizing gas are dispersed into the waste water, whereupon organic contaminants contained within the waste water are efficiently oxidized.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
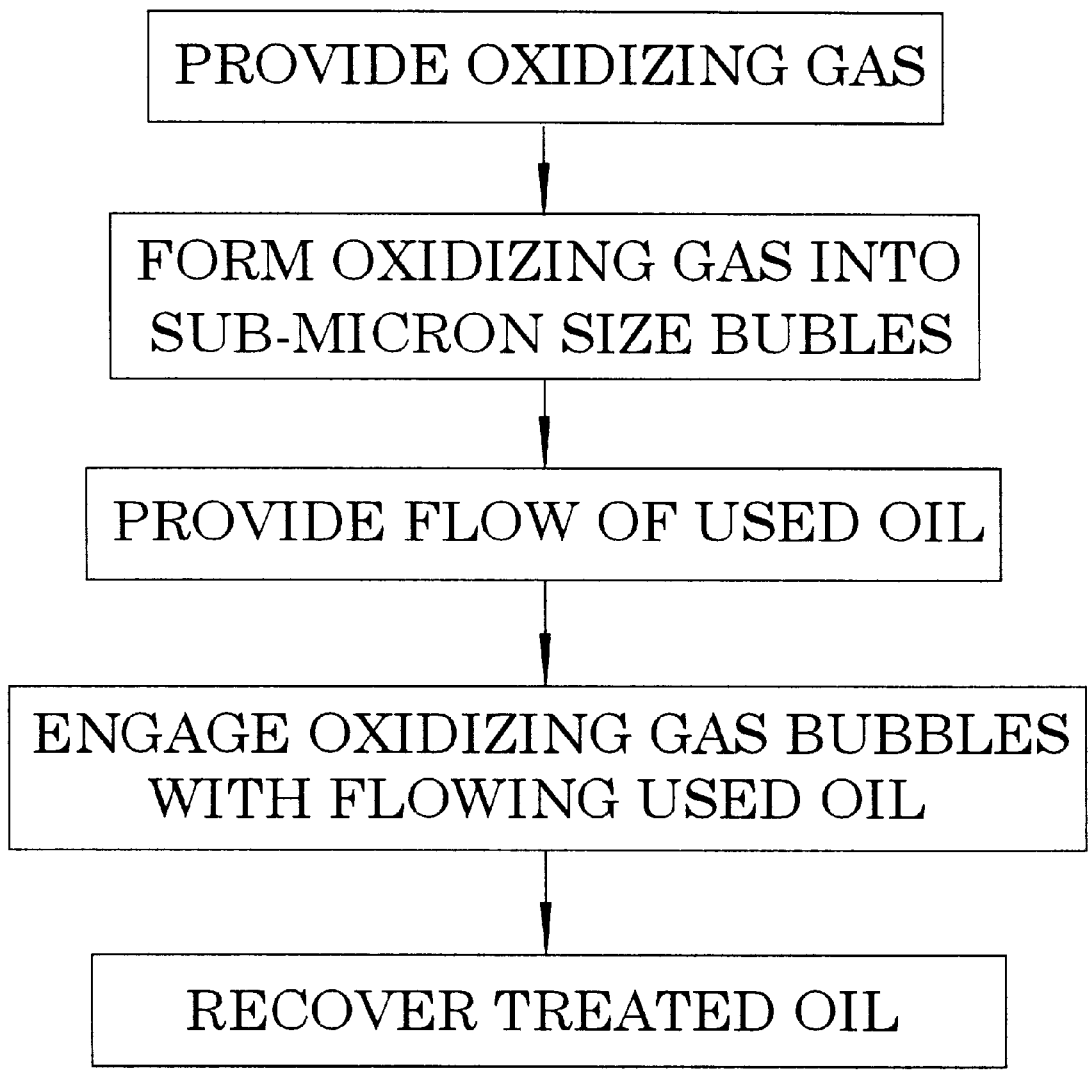
FIG. 1 is a flow chart illustrating a first embodiment of the invention.

Referring now to the Drawings, and particularly to FIG. 1 thereof, there is shown a method for the treatment of contaminated liquids with oxidizing gases comprising a first embodiment of the invention. The first step of the method comprises the manufacture of an oxidizing gas utilizing conventional and well known techniques. The oxidizing gas preferably selected from the group including ozone and chlorine dioxide, however, other oxidizing gases may be utilized in the practice of the invention, if desired. Immediately upon its manufacture, the selected oxidizing gas is formed into sub-micron size bubbles.

A quantity of used lubricating oil having organic contaminants contained therein, such as compounds of sulfur, nitrogen, etc., is caused to flow into engagement with the sub-micron size bubbles of oxidizing gas. The oxidizing gas bubbles are dispersed into the used lubricating oil whereupon organic contaminants contained within the oil are immediately oxidized. The sub-micron size of the bubbles of the oxidizing gas greatly increase the surface area of the oxidizing gas/used lubricating oil interface which substantially increases the efficiency of the oxidizing reaction. Upon completion of the oxidation reaction, the treated lubricating oil is recovered for further processing and/or reuse.

Figure 2:
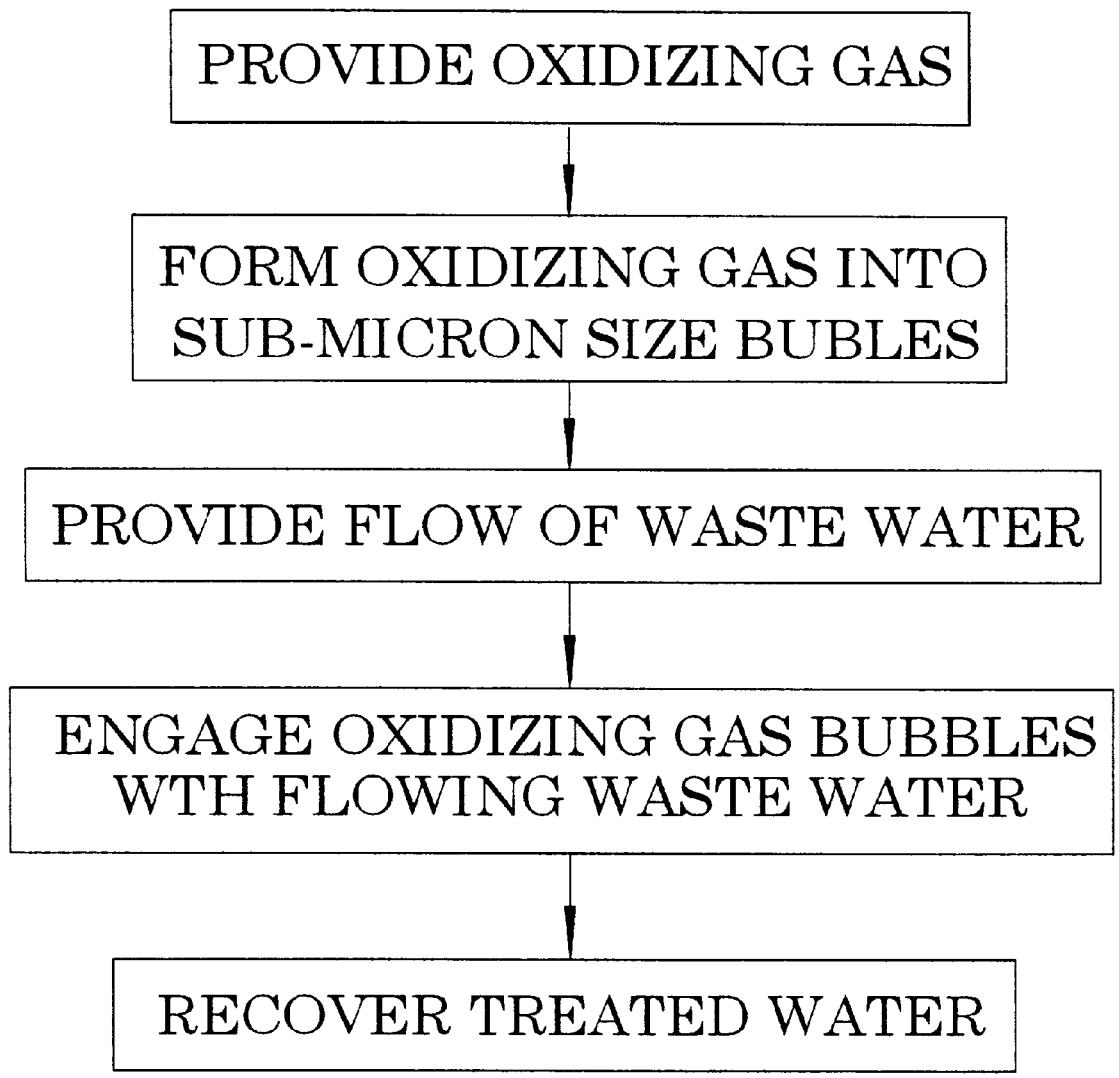
FIG. 2 is a flow chart illustrating a second embodiment of the invention.

Referring to FIG. 2, there is shown a method for the treatment of contaminated liquids with oxidizing gases comprising a second embodiment of the invention. The first step of the method comprises the manufacture of an oxidizing gas utilizing conventional and well known techniques. The oxidizing gas preferably selected from the group including ozone and chlorine dioxide, however, other oxidizing gases may be utilized in the practice of the invention, if desired. Immediately upon its manufacture, the selected oxidizing gases are formed into sub-micron size bubbles.

A quantity of waste water having organic contaminants contained therein is caused to flow into engagement with the sub-micron sized bubbles of oxidizing gas. The oxidizing gas bubbles are dispersed into the waste water whereupon organic contaminants contained within the water are immediately oxidized. The sub-micron size of the bubbles of the oxidizing gas greatly increase the surface area of the oxidizing gas/waste water interface which substantially increases the efficiency of the oxidizing reaction. Upon completion of the oxidation reaction, the treated water is recovered for discharge, further processing, and/or reuse.

Figure 3:
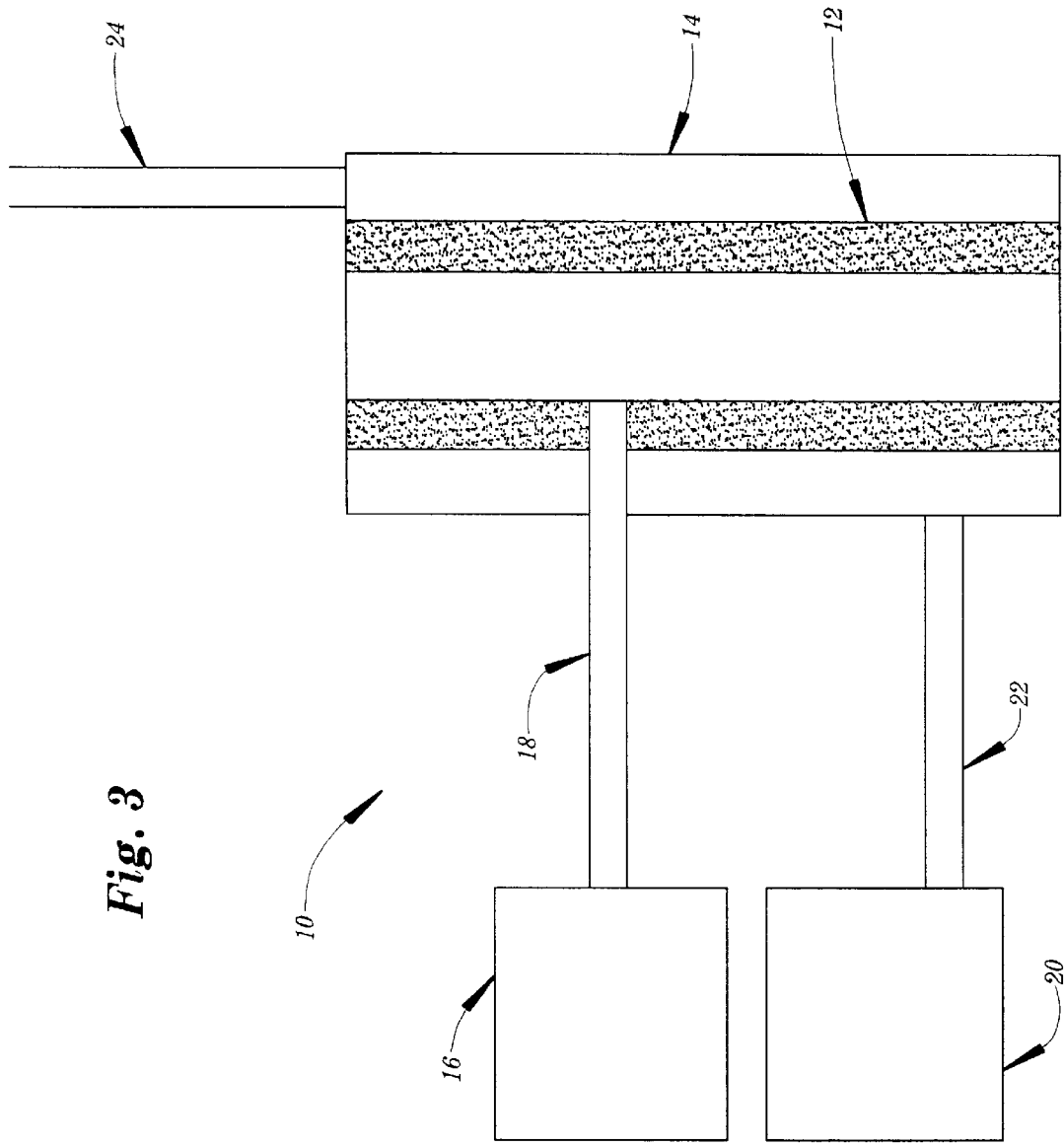
FIG. 3 is a diagrammatic illustration of a first apparatus useful in the practice of the method of the invention.

Referring now to FIG. 3 a there is shown an apparatus 10 which may be utilized in the practice in the method of the invention. The apparatus 10 includes a hollow tube 12 formed from sintered stainless steel or glass. The sintered stainless steel or glass tube 12 is positioned within a tank 14. An oxidizing gas is manufactured within a source 16 utilizing conventional and well known techniques. The oxidizing gas is preferably selected from the group including ozone and chlorine dioxide, however, other oxidizing gases may be utilized in the practice of the invention if desired. Immediately upon its manufacture a the oxidizing gas from the source 16 is directed into the interior of the sintered stainless steel or glass tube 12 through piping 18.

Meanwhile a liquid having organic contaminants initially contained therein is caused to flow from a source 20 through piping 22 and the tank 14 to an outlet 24. The source 20 may comprise a conventional reservoir, tank, etc., which receives contaminated liquid from one or more sources. Alternatively, the source 20 may comprise the discharge from a facility which produces contaminated liquid in its operation.

The pressure of the oxidizing gas within the interior of the sintered stainless steel or glass tube 12 is maintained high enough to prevent liquid contained within the tank 14 from flowing inwardly through the sintered stainless steel tube 12 into the interior thereof. Rather, oxidizing gas flows outwardly from the interior of the sintered stainless steel tube 12. As the oxidizing gas flows outwardly, it is formed into sub-micron size bubbles which leave the exterior surface of the sintered stainless steel or glass tube 12 and are dispersed in the contaminated liquid.

As the initially contaminated liquid from the source 20 flows through the tank 14, it passes over the exterior surface of the sintered stainless steel or glass tube 12 thereby cleaving the sub-micron size bubbles of oxidizing gas from the exterior surface thereof. The sub-micron sized bubbles of oxidizing gas are immediately dispersed throughout the flowing liquid, whereupon organic contaminants contained within the liquid are immediately oxidized. It will be appreciated that because of the sub-micron size of the bubbles comprising the oxidizing gas the surface area of the interface between the oxidizing gas and the initially contaminated liquid is greatly increased, thereby greatly increasing the efficiency of the oxidizing reaction.

Figure 4:
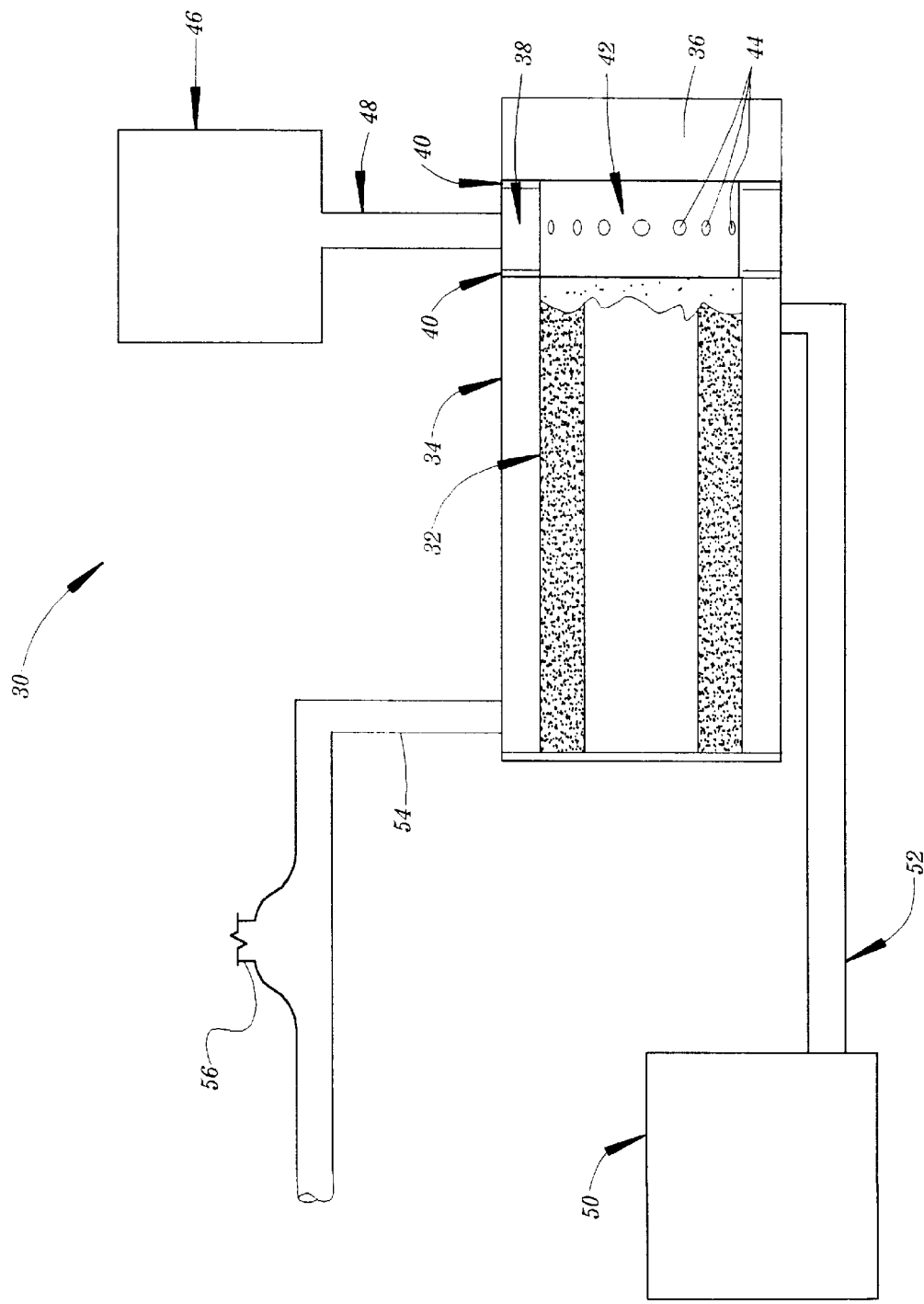
FIG. 4 is a diagrammatic illustration of a second apparatus useful in the practice of the method of the invention.

An alternative apparatus 30 which may be utilized in the practice of the method of the invention is illustrated in FIG. 4. The apparatus 30 includes a sintered stainless steel or glass tube 32 having a hollow interior which is supported within a tank 34 for rotation about its longitudinal axis. A motor 36 is positioned at one end of the tank 34 and is operatively connected to the sintered stainless steel tube 32 to effect rotation thereof relative to the tank 34. An annulus 38 is located at one end of the tank 34 and is separated from the tank 34 and from the motor 36 by seals 40. A collar 42 connects the annulus 38 to the interior of the sintered stainless steel or glass tube 32 through a plurality of passageways 44.

In the operation of the apparatus 30 an oxidizing gas is manufactured within a source 46 utilizing conventional and well known techniques. The oxidizing gas is preferably selected from the group including ozone and chlorine dioxide, however, other oxidizing gases may be utilized in the practice of the invention. Immediately upon its manufacture a the oxidizing gases are directed into the annalus 38 through piping 48. From the annalus 38 the oxidizing gas flows into the interior of the sintered stainless steel or glass tube 32 through the passageways 44 of the collar 42.

A liquid having organic contaminants contained therein is received from a source 50. The source 50 may comprise a conventional reservoir or tank which receives the contaminated liquid from one or more sources. Alternatively, the source 50 may comprise the discharge of a facility which produces contaminated liquid as a part of its operation.

Liquid having organic contaminants contained therein continuously flows from the source 50 through piping 52 and through the tank 34 to an outlet 54. The pressure of the oxidizing gas within the hollow interior of the sintered stainless steel or glass tube 32 is maintained sufficiently high that liquid flowing through the tank 34 does not flow inwardly through the sintered stainless steel or glass tube 32 into the interior thereof. Rather, oxidizing gas from the source 46 flows outwardly from the interior of the sintered stainless steel or glass tube 32 to the outer surface thereof.

The outwardly flowing oxidizing gas accumulates on the exterior surface of the sintered stainless steel tube 32 in the form of sub-micron size bubbles. The sub-micron size bubbles of oxidizing gas are immediately cleaved from the exterior surface of the sintered stainless steel tube by the flow of the initially contaminated liquid over the exterior surface of the sintered stainless steel tube 32. The sub-micron sized bubbles are dispersed throughout the flowing liquid whereby the organic contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 54. It is contemplated that all of the oxidizing gas will be consumed by the oxidizing reaction. If not, excess oxidizing gas may be recovered from the treated liquid through an outlet 56 and thereafter properly disposed of.

Figure 5:
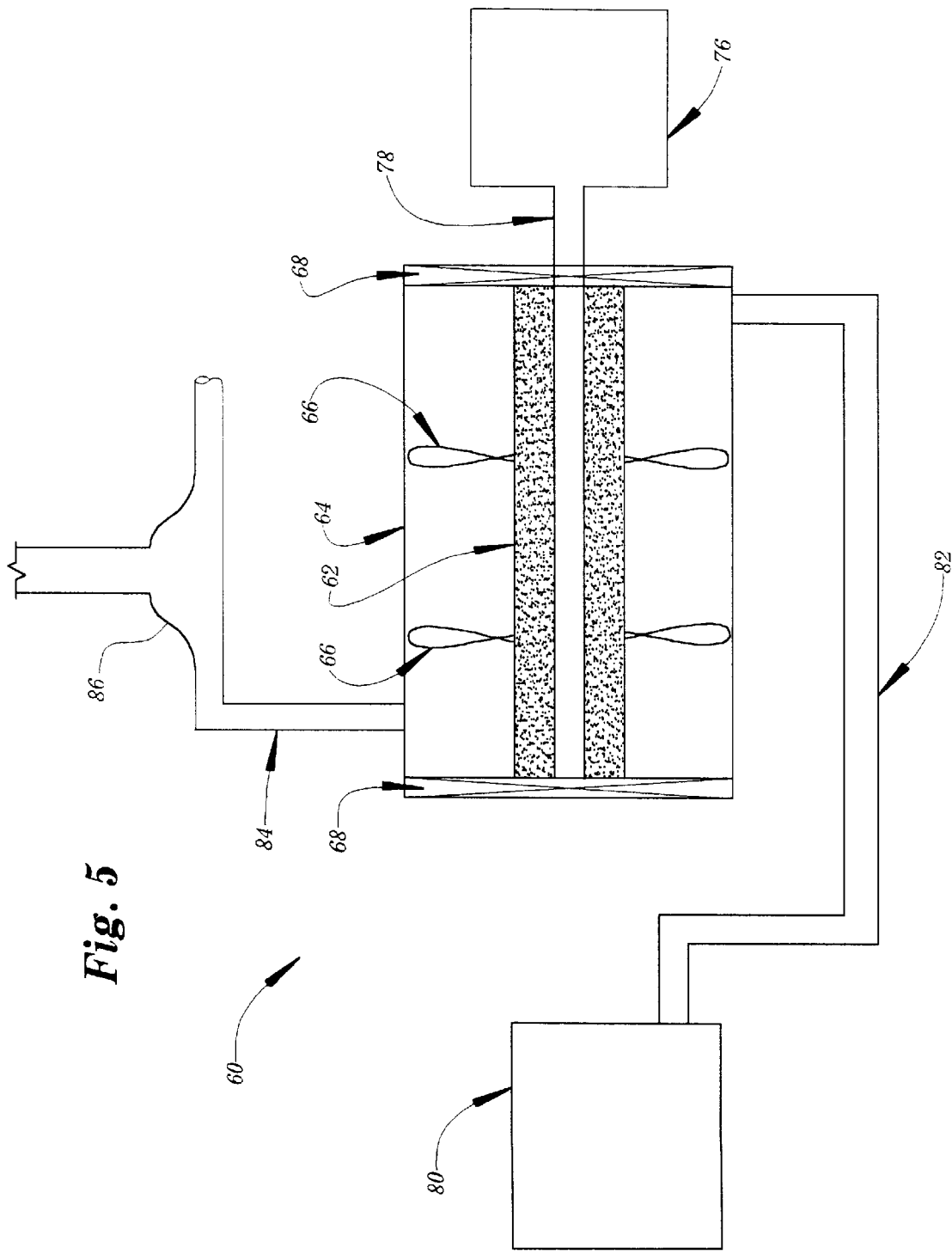
FIG. 5 is a diagrammatic illustration of a third apparatus useful in the practice of the method of the invention.

An alternative apparatus 60 which may be utilized in the practice of the method of the invention is illustrated in FIG. 5. The apparatus 60 includes a sintered stainless steel or glass tube 62 having a hollow interior which is supported within a tank 64 for rotation about its longitudinal axis. One or more turbines 66 are mounted on the sintered stainless steel tube 62 to effect rotation thereof relative to the tank 64.

In the operation of the apparatus 60 a an oxidizing gas is manufactured within a source 76 utilizing conventional and well known techniques. The oxidizing gas is preferably selected from the group including ozone and chlorine dioxide, however, other oxidizing gases may be utilized in the practice of the invention. Immediately upon its manufacture the oxidizing gases are directed into the interior of the sintered stainless steel or glass tube 62.

A liquid having organic contaminants contained therein is received from a source 80. The source 80 may comprise a conventional reservoir or tank which receives the contaminated liquid from one or more sources. Alternatively, the source 80 may comprise the discharge of a facility which produces contaminated liquid as a part of its operation.

Liquid having organic contaminants contained therein continuously flows from the source 80 through piping 82 and through the tank 64 to an outlet 84. The pressure of the oxidizing gas within the hollow interior of the sintered stainless steel tube 62 is maintained sufficiently high that liquid flowing through the tank 64 does not flow inwardly through the sintered stainless steel tube 62 into the interior thereof. Rather, oxidizing gas from the source 76 flows outwardly from the interior of the sintered stainless steel tube 62 to the outer surface thereof.

The outwardly flowing oxidizing gas accumulates on the exterior surface of the sintered stainless steel tube 62 in the form of sub-micron size bubbles. The sub-micron size bubbles of oxidizing gas are immediately cleaved from the exterior surface of the sintered stainless steel tube by the flow of the initially contaminated liquid over the exterior surface of the sintered stainless steel tube 62. The sub-micron sized bubbles are dispersed throughout the flowing liquid whereby the organic contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 84. It is contemplated that all of the oxidizing gas will be consumed by the oxidizing reaction. If not, excess oxidizing gas may be recovered from the treated liquid through an outlet 86 and thereafter properly disposed of.

In the operation of the apparatus 60 shown in FIG. 5 a the exterior surface of the sintered stainless steel tube 62 is rotated relative to the liquid flowing through the tank 64 under the action of the turbines 66. By this means the relative movement between the exterior surface of the sintered stainless steel tube 62 and the initially contaminated liquid flowing through the tank 64 is greatly increased. This in turn increases the number of sub-micron sized bubbles of oxidizing gas which are dispersed into the flowing liquid, thereby increasing the efficiency of the oxidation reaction.

Those skilled in the art will appreciate the fact that the use of the apparatus 30 shown in FIG. 4 or the apparatus 60 shown in FIG. 5 provides certain advantages with respect to the use of the apparatus shown in FIG. 3 in the practice of method of the invention. When the apparatus 30 of FIG. 4 is utilized, the relative movement between the exterior surface of the sintered stainless steel tube 32 and the initially contaminated liquid flowing through the tank 34 depends upon the operation of the motor 36 rather than the flow rate of the liquid. This allows a greater number of sub-micron size bubbles of oxidizing gas to be dispersed into the initially contaminated liquid than would be possible if the cleaving of sub-micron sized bubbles of oxidizing gas from the exterior surface of the sintered stainless steel tube depended upon the flow of liquid alone. In this manner the efficiency of the oxidation reaction can be further increased.

When the apparatus 60 of FIG. 5 is utilized, the relative movement between the exterior surface of the sintered stainless steel tube 62 and the initially contaminated liquid flowing through the tank 34 is greatly increased by the operation of the turbines 66. This allows a greater number of sub-micron size bubbles of oxidizing gas to be dispersed into the initially contaminated liquid than would be possible if the cleaving of sub-micron sized bubbles of oxidizing gas from the exterior surface of the sintered stainless steel tube depended upon the flow of liquid alone. In this manner the efficiency of the oxidation reaction can be further increased.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method of removing organic contaminants from liquids comprising the steps of:

providing an oxidizing gas selected from the group including ozone and chlorine dioxide;

forming the oxidizing gas into sub-micron size bubbles;

providing a flow of liquid initially having at least one contaminant material contained therein;

dispersing the sub-micron size bubbles of the oxidizing gas into the flowing initially contaminated liquid and thereby substantially immediately oxidizing substantially all of the contaminant contained in the liquid; and recovering the treated liquid.

2. The method of claim 1 wherein the oxidizing gas is formed into sub-micron size bubbles and dispersed into the flowing initially contaminated liquid immediately upon its manufacture.

3. The method according to claim 1 wherein:

the oxidizing gas is directed through sintered material to an exterior surface; and the flowing initially contaminated liquid is directed across the exterior surface thereby cleaving sub-micron sized bubbles of oxidizing gas from the exterior surface.

4. The method according to claim 3 including the additional step of moving the exterior surface relative to the flowing liquid.

5. A method of removing organic contaminants from a petroleum distillate comprising the steps of:

providing an oxidizing gas selected from the group including ozone and chlorine dioxide;

forming the oxidizing gas into sub-micron size bubbles;

providing a flow of petroleum distillates initially containing at least one contaminant material;

dispersing the sub-micron sized bubbles of the oxidizing gas into the flowing initially contaminated petroleum distillates and thereby substantially immediately oxidizing substantially all of the contaminant material; and recovering the treated petroleum distillates.

6. The method of claim 5 wherein the oxidizing gas is formed into sub-micron size bubbles and dispersed into the flowing initially contaminated petroleum distillate immediately upon its manufacture.

7. The method according to claim 5 wherein:

the oxidizing gas is directed through sintered material to an exterior surface; and the flowing initially contaminated petroleum distillate is directed across the exterior surface thereby cleaving sub-micron sized bubbles of oxidizing gas from the exterior surface.

8. The method according to claim 5 including the additional step of moving the exterior surface relative to the flowing petroleum distillate.

9. A method of removing organic contaminants from waste water comprising the steps of:

providing an oxidizing gas selected from the group including ozone and chlorine dioxide;

forming the oxidizing gas into sub-micron size bubbles;

providing a flow of waste water initially having at least one contaminant material contained therein;

dispersing the sub-micron sized bubbles of the oxidizing gas into the flowing initially contaminated waste water and thereby substantially immediately oxidizing substantially all of the contaminant material; and recovering the treated water.

10. The method of claim 9 wherein the oxidizing gas is formed into sub-micron size bubbles and dispersed into the flowing initially contaminated waste water immediately upon its manufacture.

11. The method according to claim 9 wherein:

the oxidizing gas is directed through sintered material to an exterior surface; and the flowing initially contaminated waste water is directed across the exterior surface thereby cleaving sub-micron sized bubbles of oxidizing gas from the exterior surface.

12. The method according to claim 11 including the additional step of moving the exterior surface relative to the flowing liquid.

* * * * *

UNITED STATES PATENT AND TRADEMARK OFFICE
CERTIFICATE OF CORRECTION

PATENT NO. : 6,103,130
DATED : August 15, 2000
INVENTOR(S): Jeffrey H. Sherman

It is certified that error appears in the above-identified patent and that said Letters Patent are hereby corrected as shown below:

Col. 2, line 55, replace "3 a" with --3,--.

Col. 2, line 65, replace "manufacture a" with --manufacture,--.

Col. 3, lines 48-49, replace "manufacture a" with --manufacture,--.

Col. 4, line 26, replace "60 a" with --60,--.

Col. 5, line 1, replace "FIG. 5 a" with --FIG. 5,--.

Col. 5, line 13, replace "practice of" with --practice of the--.

Signed and Sealed this

Tenth Day of April, 2001

Attest:

NICHOLAS P. GODICI

*Attesting Officer*  *Acting Director of the United States Patent and Trademark Office*